US011951839B2

(12) United States Patent
Wang et al.

(10) Patent No.: US 11,951,839 B2
(45) Date of Patent: Apr. 9, 2024

(54) SIDE-BY-SIDE ALL-TERRAIN VEHICLE

(71) Applicant: SEGWAY TECHNOLOGY CO., LTD., Changzhou (CN)

(72) Inventors: Ronghua Wang, Beijing (CN); Ge Fan, Beijing (CN)

(73) Assignee: SEGWAY TECHNOLOGY CO., LTD., Changzhou (CN)

( * ) Notice: Subject to any disclaimer, the term of this patent is extended or adjusted under 35 U.S.C. 154(b) by 307 days.

(21) Appl. No.: 17/548,210

(22) Filed: Dec. 10, 2021

(65) Prior Publication Data

US 2022/0097511 A1   Mar. 31, 2022

Related U.S. Application Data

(63) Continuation of application No. PCT/CN2019/127165, filed on Dec. 20, 2019.

(30) Foreign Application Priority Data

Jun. 13, 2019 (CN) .......................... 201920890363.5

(51) Int. Cl.
*B60K 6/28* (2007.10)
*B60K 1/04* (2019.01)
(Continued)

(52) U.S. Cl.
CPC ................. *B60K 6/28* (2013.01); *B60K 1/04* (2013.01); *B60K 6/40* (2013.01); *B60K 11/04* (2013.01);
(Continued)

(58) Field of Classification Search
CPC ... B60K 6/28; B60K 6/40; B60K 1/04; B60K 11/04; B60K 13/02; B60K 13/04; B62D 23/00; B60Y 2200/20
See application file for complete search history.

(56) References Cited

U.S. PATENT DOCUMENTS 4,697,660 A * 10/1987 Wu .......................... B60K 1/00
                                                        180/297
5,327,989 A *  7/1994 Furuhashi ............ B62D 21/183
                                                        180/908
(Continued)

FOREIGN PATENT DOCUMENTS

CN       101687527       3/2010
CN       103370221      10/2013
(Continued)

*Primary Examiner* — Erez Gurari
(74) *Attorney, Agent, or Firm* — Emerson, Thomson & Bennett, LLC; Roger D. Emerson; Matt J. Wilson

(57) ABSTRACT

A side-by-side all-terrain vehicle, comprising: a vehicle body comprising a cockpit and a power compartment, the power compartment being located behind the cockpit; a powertrain comprising a power motor, the power motor being provided in the power compartment; and a power battery being provided in the cockpit, and the power battery being configured to supply power to the power motor. Thus, by using the power motor as a power source, exhaust gas emissions can be reduced, and the economic efficiency of an all-terrain vehicle can be improved. By providing the power battery in the cockpit, the interior space of the cockpit can be rationally used, so that insufficient rear space of the vehicle body is avoided, and the power battery suffers less external interference and has better usage safety.

19 Claims, 3 Drawing Sheets

(51) Int. Cl.
  *B60K 6/40* (2007.10)
  *B60K 11/04* (2006.01)
  *B60K 13/02* (2006.01)
  *B60K 13/04* (2006.01)
  *B62D 23/00* (2006.01)
(52) U.S. Cl.
  CPC .............. *B60K 13/02* (2013.01); *B60K 13/04* (2013.01); *B62D 23/00* (2013.01); *B60Y 2200/20* (2013.01)

(56) References Cited

U.S. PATENT DOCUMENTS

| | | | |
|---|---|---|---|
| 8,657,058 B2 | 2/2014 | Takagi | |
| 8,662,239 B2 * | 3/2014 | Takagi | B60K 6/48 180/65.245 |
| 9,038,754 B2 * | 5/2015 | Takagi | B60K 5/06 180/65.22 |
| 9,216,777 B2 * | 12/2015 | Nakamura | B60K 5/00 |
| 9,533,570 B2 * | 1/2017 | Matsuda | B60L 58/26 |
| 9,932,073 B2 * | 4/2018 | Dube | B60K 13/02 |
| 10,118,464 B2 * | 11/2018 | Herrmann | B60H 1/3208 |
| 10,118,477 B2 * | 11/2018 | Borud | B60K 6/442 |
| 10,479,422 B2 * | 11/2019 | Hollman | F16D 9/06 |
| 10,780,770 B2 * | 9/2020 | Kohler | B60K 6/40 |
| 11,014,419 B2 * | 5/2021 | Danielson | B60K 13/04 |
| 11,110,977 B2 * | 9/2021 | Smith | B60K 17/348 |
| 11,772,565 B2 * | 10/2023 | Zaremba | B60R 7/043 296/37.15 |
| 2004/0195019 A1 * | 10/2004 | Kato | B60K 13/02 180/68.3 |
| 2004/0195797 A1 * | 10/2004 | Nash | B60G 7/02 280/124.136 |
| 2007/0210617 A1 * | 9/2007 | Nakamura | B62D 33/0617 296/190.08 |
| 2008/0023249 A1 * | 1/2008 | Sunsdahl | B62D 21/183 180/312 |
| 2009/0071737 A1 * | 3/2009 | Leonard | B60L 58/21 296/182.1 |
| 2009/0301830 A1 * | 12/2009 | Kinsman | F16F 9/0218 188/289 |
| 2010/0155170 A1 * | 6/2010 | Melvin | F16H 57/0489 180/339 |
| 2012/0056411 A1 * | 3/2012 | Nakamura | B62D 33/037 296/65.01 |
| 2012/0217078 A1 * | 8/2012 | Kinsman | B60K 17/34 280/756 |
| 2012/0223500 A1 * | 9/2012 | Kinsman | B62D 27/065 180/312 |
| 2012/0255799 A1 * | 10/2012 | Kohler | B60L 58/20 180/65.245 |
| 2013/0033070 A1 * | 2/2013 | Kinsman | B60J 5/0487 296/190.03 |
| 2013/0087395 A1 * | 4/2013 | Kaku | B60K 20/04 74/543 |
| 2013/0087397 A1 * | 4/2013 | Yamamoto | B60G 21/0551 280/124.134 |
| 2013/0092466 A1 | 4/2013 | Foss | |
| 2014/0144719 A1 * | 5/2014 | Morgan | B60T 1/062 180/65.31 |
| 2017/0028881 A1 * | 2/2017 | Proulx | B60N 2/38 |
| 2017/0029035 A1 * | 2/2017 | Dube | B60R 7/043 |
| 2017/0029036 A1 * | 2/2017 | Proulx | B60N 2/305 |
| 2017/0174027 A1 * | 6/2017 | Mailhot | B60R 21/13 |
| 2018/0264928 A1 * | 9/2018 | Takaki | B60L 50/15 |
| 2023/0364978 A1 * | 11/2023 | Liang | E05D 11/06 |

FOREIGN PATENT DOCUMENTS

| | | |
|---|---|---|
| DE | 102017103678 | 9/2017 |
| WO | WO2019044291 A1 | 3/2019 |

* cited by examiner

SIDE-BY-SIDE ALL-TERRAIN VEHICLE

CROSS-REFERENCE TO RELATED APPLICATIONS

The present disclosure is a continuation of international application No. PCT/CN2019/127165 filed on Dec. 20, 2019, which claims priority to Chinese Patent Application No. 201920890363.5 filed with the CNIPA on Jun. 13, 2019, and entitled "SIDE-BY-SIDE ALL-TERRAIN VEHICLE", which are incorporated herein by reference.

TECHNICAL FIELD

The present disclosure relates to the field of vehicle technology, in particular to a side-by-side all-terrain vehicle.

BACKGROUND

All-terrain vehicles refer to vehicles that can travel on any terrain. They can ride freely on terrains that are difficult for ordinary vehicles to maneuver. They are commonly known as ATVs in China. This type of vehicle has a variety of uses and is not restricted by road conditions. It is widely used in North America and Western Europe, showing an upward trend year by year.

In related arts, an all-terrain vehicle generally uses an engine as a power source, and a single engine as the power source can no longer meet the needs of the all-terrain vehicle, and the engine still has problems of exhaust gas pollution and poor economic efficiency. In addition, with the development of new energy, there are more and more new energy vehicles, but how to apply new energy technology to all-terrain vehicles is still an unsolved problem.

SUMMARY

The present disclosure aims to solve at least one of the technical problems existing in the prior art. To this end, one purpose of the present disclosure is to propose a side-by-side all-terrain vehicle, and the side-by-side all-terrain vehicle uses a power motor as a power source, which can improve the performance of the all-terrain vehicle and may reduce exhaust gas emissions.

The side-by-side all-terrain vehicle according to the present disclosure, includes: a vehicle body, the vehicle body including a cockpit and a power compartment, the power compartment being located behind the cockpit; a powertrain, the powertrain including a power motor, the power motor being provided in the power compartment; and a power battery, the power battery being provided in the cockpit, and the power battery being configured to supply power to the power motor.

Thus, by using the power motor as a power source, exhaust gas emissions can be reduced, and the economic efficiency of an all-terrain vehicle can be improved. By providing the power battery in the cockpit, the interior space of the cockpit can be rationally used, so that insufficient rear space of the vehicle body is avoided, and the power battery thus arranged suffers less external interference and has better usage safety. In addition, by providing the power motor in the power compartment, the power motor may be separated from the cockpit, which may reduce working noise transmitted by the power motor to the cockpit, and may improve the driving comfort of the all-terrain vehicle. The power motor may also reduce exhaust gas pollution and improve the environmental performance of the all-terrain vehicle. In addition, the power battery and the power motor thus arranged are relatively close, the connection relationship is stable, and the load distribution in the vehicle body can be made uniform, which may help improve the driving stability of the all-terrain vehicle.

In some examples of the present disclosure, the vehicle body includes: a vehicle frame and a seat bracket, the vehicle frame includes a front part, a middle portion and a rear part, the middle portion forms a part of the cockpit, the seat bracket is provided in the middle part, the rear portion forms at least a part of the power compartment, and the power battery is provided between the seat bracket and the middle part.

In some examples of the present disclosure, the power battery is provided in plural, and arranged transversely in interval.

In some examples of the present disclosure, there are two power batteries, the side-by-side all-terrain vehicle further includes: a transmission shaft extending longitudinally and drivingly connected to the powertrain, and the transmission shaft is located between the two power batteries.

In some examples of the present disclosure, the all-terrain vehicle further includes: a storage box, and the storage box is provided inside the seat bracket and located above the power battery.

In some examples of the present disclosure, the all-terrain vehicle further includes: a controller, the controller is provided in the power compartment, and the controller is electrically connected to the power battery and the power motor respectively.

In some examples of the present disclosure, the all-terrain vehicle further includes: a radiator, the radiator is fixed to the front part, and the radiator is respectively connected to the power motor and the controller through pipelines.

In some examples of the present disclosure, an outlet of the radiator is connected to the controller through a first pipeline, the controller is connected to the power motor through a second pipeline, and the power motor is connected to an inlet of the radiator through a third pipeline.

In some examples of the present disclosure, the powertrain further includes: an engine, and the power motor is provided on one side of the engine.

In some examples of the present disclosure, the powertrain further includes: a fuel tank for supplying fuel to the engine, the fuel tank is provided between the seat bracket and the middle part, and the fuel tank and the power battery are arranged transversely in interval.

In some examples of the present disclosure, the all-terrain vehicle further includes: a transmission shaft extending longitudinally and drivingly connected to the powertrain, and the transmission shaft is located between the fuel tank and the power battery.

In some examples of the present disclosure, the all-terrain vehicle further includes: a storage box, and the storage box is provided inside the seat bracket and located above the power battery and/or the fuel tank.

In some examples of the present disclosure, the all-terrain vehicle further includes: a controller, the controller is provided in the power compartment, and the controller is electrically connected to the power battery and the power motor respectively.

In some examples of the present disclosure, the all-terrain vehicle further includes: a first radiator and a second radiator, the first radiator is fixed to the front part, the second radiator is fixed on a front surface of the first radiator, the first radiator is connected to the engine through a pipeline, and the second radiator is connected to the controller and the power motor through pipelines.

In some examples of the present disclosure, an outlet of the second radiator is connected to the controller through a first pipeline, the controller is connected to the power motor through a second pipeline, and the power motor is connected to an inlet of the radiator through a third pipeline.

In some examples of the present disclosure, the all-terrain vehicle further includes: an air filter, the air filter is provided at a rear of the cockpit, and the air filter is in air connection with the engine.

In some examples of the present disclosure, the all-terrain vehicle further includes: an exhaust apparatus, the exhaust apparatus is provided behind the power compartment, and the exhaust apparatus is in air connection with the engine.

In some examples of the present disclosure, a groove is provided at a bottom of the middle part, and the power battery is provided in the groove.

In some examples of the present disclosure, the seat bracket is detachably installed on the middle part.

In some examples of the present disclosure, the seat bracket is provided with a seat, the seat includes a seat cushion and a backrest, the seat cushion is detachably installed on the seat bracket, and the backrest is detachably installed on the seat cushion.

In some examples of the present disclosure, the seat includes: a driver seat and a passenger seat, the driver seat and the passenger seat are distributed transversely and are two independent seats, and both the driver seat and the passenger seat are detachably installed on the seat bracket.

In some examples of the present disclosure, the all-terrain vehicle further includes: a ceiling, and the ceiling is detachably installed at the middle part.

Additional aspects and advantages of the present disclosure will be partially provided in the following description, and some will become apparent from the following description, or be understood through the practice of the present disclosure.

BRIEF DESCRIPTION OF THE DRAWINGS

The above and/or additional aspects and advantages of the present disclosure will become apparent and easy to understand from the description of embodiments in conjunction with the following accompanying drawings, in which.

REFERENCE NUMERALS

1000. All-terrain vehicle;
100. Vehicle body;
10. Cockpit; 20. Power compartment; 30. Vehicle frame; 31. Front part; 311. Rocker arm bracket; 312. Bottom sheet metal;
32. Middle part; 321. Outer side tube; 322. Inner longitudinal beam; 323. Bottom plate; 324. Support bar; 325. Inner cross beam; 326. Front support frame;
327. First outer side tube; 328. Second outer side tube; 328a. First bottom tube section; 328b. Front tube section; 328c. Rear tube section;
329. Third outer side tube; 330. Fourth outer side tube; 330a. Second bottom tube section; 330b. Left tube section; 330c. Right tube section;
33. Rear part; 331. Lower side beam; 332. Middle cross beam; 333. Bottom mounting member; 334. Upper side beam; 335. Middle cross bar; 336. Top mounting member; 337. Connecting beam; 338. Upper mounting feet; 339. Rear axle mounting plate; 339a. Lower mounting hole; 340. Controller bracket; 341. Upper cross beam;
40. Seat bracket; 50. Seat; 51. Seat cushion; 52. Backrest; 50a. Driver seat; 60. Ceiling; 70. Cargo hopper;
200. Powertrain; 210. Power motor; 220. Engine; 300. Power battery; 500. Controller; 600. Radiator; 610. First radiator; 620. Second radiator; 700. Fuel tank; 800. Air filter; 900. Exhaust apparatus.

DETAILED DESCRIPTION OF EMBODIMENTS

Embodiments of the present disclosure are described in detail below. The embodiments described with reference to the accompanying drawings are exemplary. The embodiments of the present disclosure are described in detail below.

The following describes an all-terrain vehicle 1000 according to the embodiments of the present disclosure with reference to FIGS. 1 to 5. The all-terrain vehicle 1000 is a side-by-side all-terrain vehicle 1000, and the side-by-side all-terrain vehicle 1000 has side-by-side seats.

Figure 1:
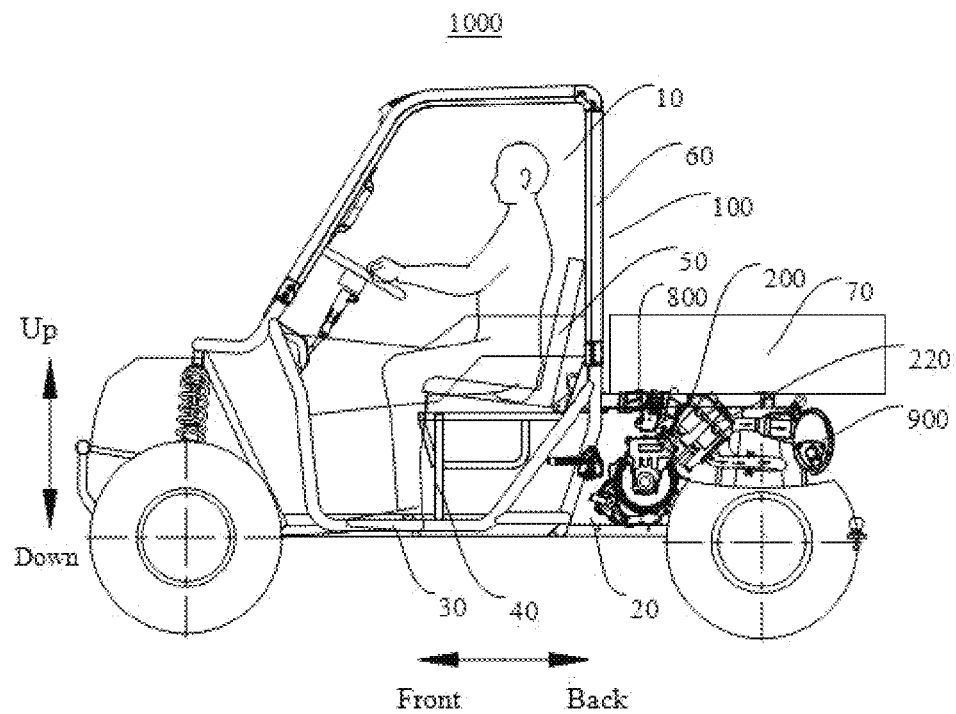
FIG. 1 is a left view of an all-terrain vehicle according to an embodiment of the present disclosure.
Figure 2:
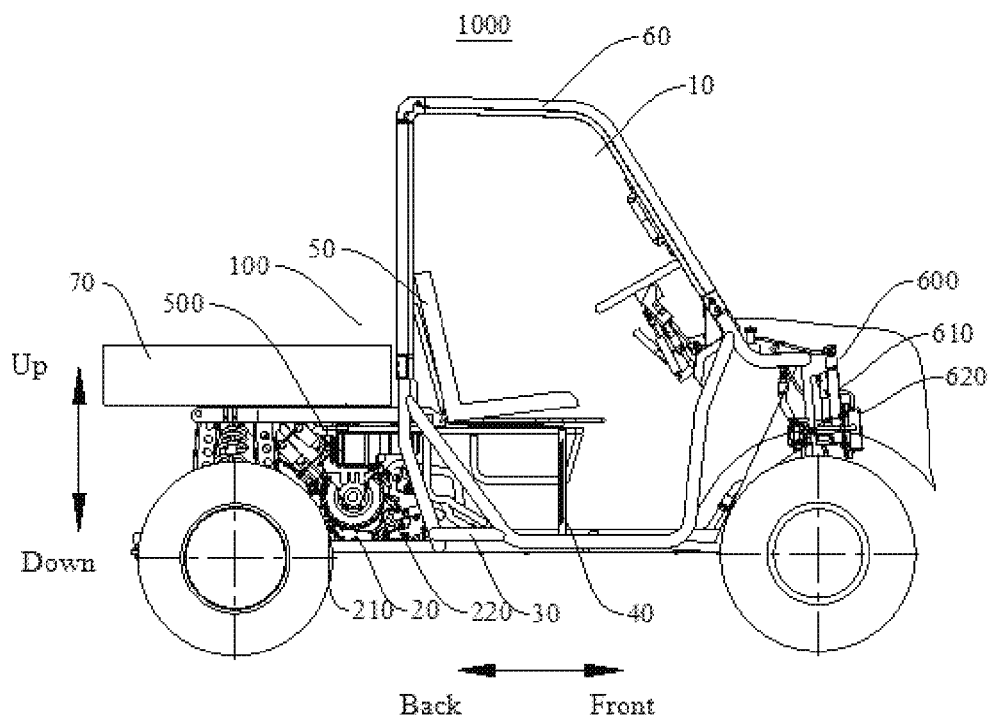
FIG. 2 is a right view of the all-terrain vehicle according to an embodiment of the present disclosure.

As shown in FIGS. 1 and 2, the side-by-side all-terrain vehicle 1000 according to an embodiment of the present disclosure may include: a vehicle body 100, a powertrain 200, and a power battery 300, where the powertrain 200 and the power battery 300 are both provided in the vehicle body 100, and the power battery 300 is used for supplying power for the powertrain 200, that is, the power battery 300 is a power source of the powertrain 200.

As shown in FIGS. 1 and 2, the vehicle body 100 includes a cockpit 10 and a power compartment 20. The power compartment 20 is located behind the cockpit 10, that is, the vehicle body 100 is divided into at least two cockpits in a front and back direction. A cockpit on the front side is the cockpit 10, and the cockpit 10 is for a driver and a passenger to ride. The driver may perform driving operations in the cockpit. The power compartment 20 is located behind the cockpit 10, and the power compartment 20 is used to place and fix the powertrain 200.

The powertrain 200 includes a power motor 210, and the power motor 210 is provided in the power compartment 20. That is, the power motor 210 is fixed in the power compartment 20, and the power motor 210 drives wheels through a transmission shaft. The power battery 300 is provided in the cockpit 10, and the power battery 300 is used for supplying power to the power motor 210. In this way, the power battery 300 is located in front of the power motor 210 and may be electrically connected to the power motor 210. When the power battery 300 works to the power motor 210, the power motor 210 may convert electrical energy of the power battery 300 into mechanical energy, and then transfer the energy to the wheels through the transmission shaft, so as to be able to drive the all-terrain vehicle 1000 to move. By using the power motor 210 as the power source, exhaust gas emissions may be reduced, and the economic efficiency of the all-terrain vehicle 1000 may be improved.

Therefore, by providing the power battery 300 in the cockpit 10, the interior space of the cockpit 10 may be rationally used, so that insufficient rear space of the vehicle body 100 is avoided, and the power battery 300 thus arranged suffers less external interference and has better usage safety. In addition, by providing the power motor 210 in the power compartment 20, the power motor 210 may be separated from the cockpit 10, which may reduce working noise transmitted by the power motor 210 to the cockpit 10, and may improve the driving comfort of the all-terrain vehicle 1000. The power motor 210 may also reduce exhaust gas pollution and improve the environmental performance of the all-terrain vehicle 1000. In addition, the power battery 300 and the power motor 210 thus arranged are relatively close, the connection relationship is stable, and the load distribution in the vehicle body 100 can be made uniform, which may help improve the driving stability of the all-terrain vehicle 1000.

It should be noted that when the powertrain 200 in the all-terrain vehicle 1000 only uses the power motor 210, the all-terrain vehicle 1000 is a pure electric all-terrain vehicle 1000, and when the powertrain 200 in the all-terrain vehicle 1000 still uses a fuel motor 220, the all-terrain vehicle 1000 is a hybrid all-terrain vehicle 1000. Users may choose corresponding all-terrain vehicles 1000 according to their needs.

The vehicle body 100 includes: a vehicle frame 30 and a seat bracket 40. The vehicle frame 30 includes a front portion 31, a middle portion 32, and a rear portion 33. The front portion 31 is used for arranging structures such as a steering system, a front axle, and a front suspension system. The middle portion 32 forms a part of the cockpit 10, the middle portion 32 mainly forms a bottom structure of the cockpit 10, the seat bracket 40 is provided in the middle portion 32, a seat 50 is installed and fixed on the seat bracket 40, and the driver and the passenger may ride on the corresponding seats 50. The rear portion 33 forms at least a part of the power compartment 20, that is, the rear portion 33 may form only a part of the power compartment 20 or may form the entire power compartment 20.

Further, the seat bracket 40 may be detachably installed in the middle portion 32, and the seat bracket 40 and the bottom of the middle portion 32 define an installation space for a plurality of components. The components may include the power battery 300, and there may be a plurality of installation spaces. The plurality of installation spaces may be respectively placed with different components or the same components, which may be selected according to actual needs. The seat bracket 40 thus arranged on the one hand may facilitate the installation and fixation of the components, and may make reasonable use of the interior space of the cockpit 10, on the other hand, it may ensure an accurate size of the seat bracket 40 itself, facilitate replacement and maintenance, and may reduce maintenance and replacement costs of the all-terrain vehicle 1000.

Figure 3:
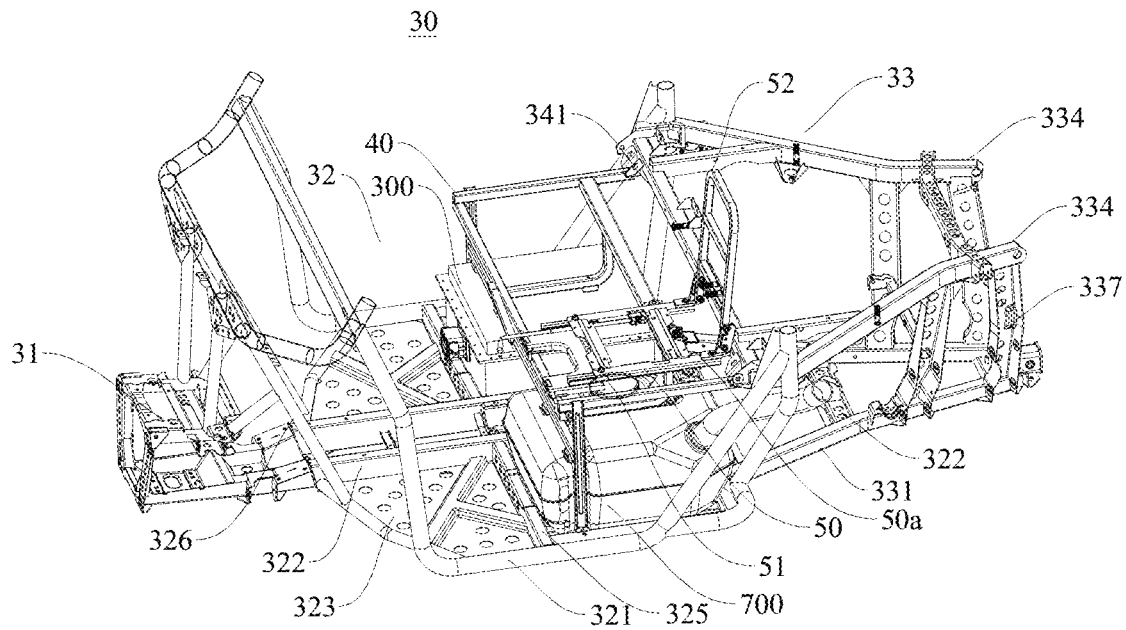
FIG. 3 is a schematic diagram of a power battery and a fuel tank provided on a vehicle frame.

For example, as shown in FIG. 3, the power battery 300 is provided between the seat bracket 40 and the bottom of the middle portion 32. In other words, the seat bracket 40 and the middle portion 32 of the vehicle frame 30 jointly define the installation space of the power battery 300. The power battery 300 thus arranged may not affect the arrangement of the seat 50 and the seat bracket 40, and can effectively use a lower space of the seat bracket 40, which may improve the space utilization of the cockpit 10. In addition, the use of the detachable seat bracket 40 may greatly facilitate the installation and disassembly of the power battery 300.

The following will respectively describe the middle portion 32, the rear portion 33 and the front portion 31 in detail.

Figure 4:
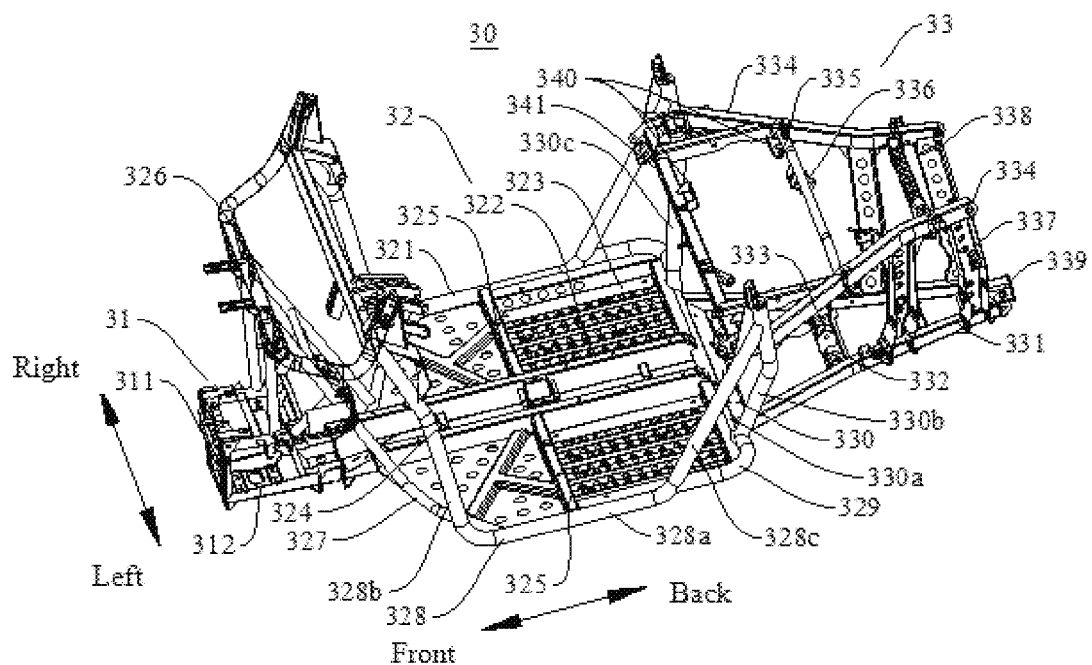
FIG. 4 is a perspective view of the vehicle frame from an angle.
Figure 5:
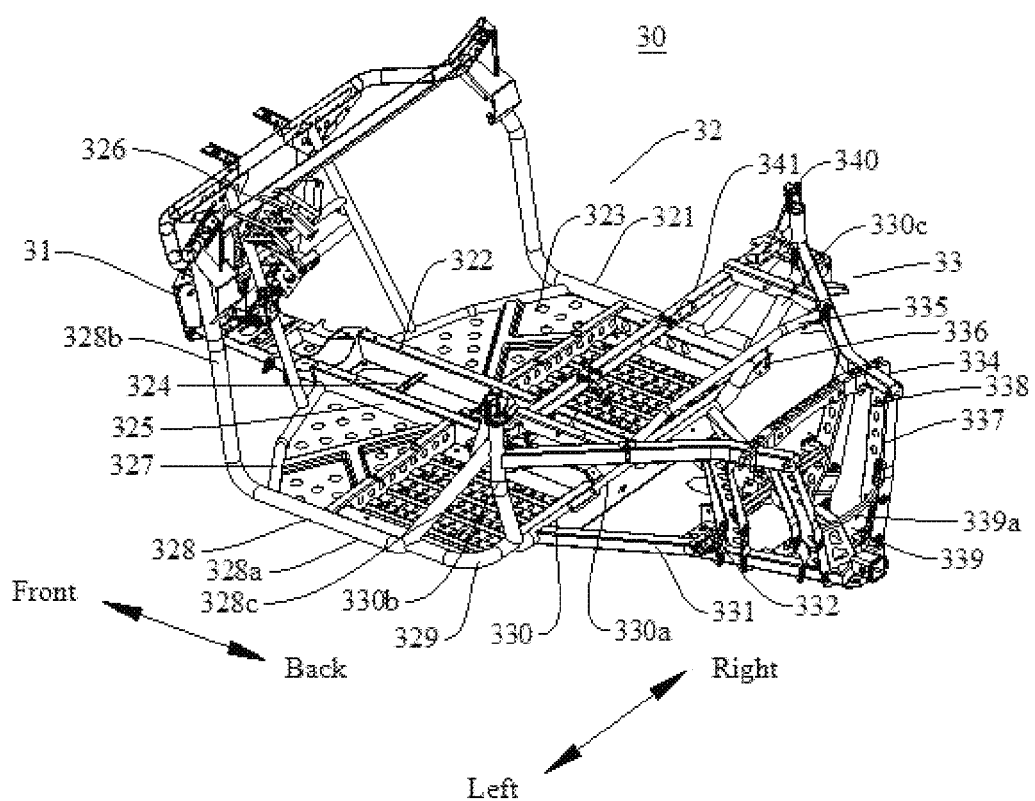
FIG. 5 is a perspective view of the vehicle frame from another angle.

According to a specific embodiment of the present disclosure, as shown in FIGS. 3 to 5, the middle portion 32 includes: an outer side tube 321, an inner longitudinal beam 322, and a bottom plate 323. The inner longitudinal beam 322 is located on an inner side of the outer side tube 321, the bottom plate 323 is connected between the outer side tube 321 and the inner longitudinal beam 322, and the bottom plate 323 forms the bottom of the installation space. It may be understood that the outer side tube 321 defines a bottom outer edge of the middle portion 32, the inner longitudinal beam 322 extends in the front and back direction, and both ends of the inner longitudinal beam 322 are connected to the outer side tube 321, which serves to strengthen a structural strength of the middle portion 32 from inside, and the bottom plate 323 may play a supporting role. The middle portion 32 thus arranged may ensure the stability of the bottom structure of the cockpit 10.

As shown in FIGS. 4 and 5, the outer side tube 321 includes a plurality of outer side tubes 321 connected in sequence, an outer side tube 321 on the front side is connected to the front end of the inner longitudinal beam 322, and an outer side tube 321 on the back side is connected to the rear end of the inner longitudinal beam 322. The use of the plurality of outer side tubes 321 may reasonably define a specific shape of the bottom part of the cockpit 10, so that the structure of the middle portion 32 may be rationally arranged.

As shown in FIGS. 4 and 5, the plurality of outer side tubes 321 include: a first outer side tube 327, a second outer side tube 328, a third outer side tube 329 and a fourth outer side tube 330. The first outer side tube 327, the second outer side tube 328 and the third outer side tube 329 are both two, and the two first outer side tubes 327, the two second outer side tubes 328 and the two third outer side tubes 329 are all distributed on the outside of two inner longitudinal beams 322, the first outer side tubes 327 are connected obliquely between the front end of the inner longitudinal beams 322 and the second outer side tubes 328, the third outer side tubes 329 are connected between the second outer side tubes 328 and the fourth outer side tube 330, and the fourth outer side tube 330 is connected to the rear ends of the two inner longitudinal beams 322. Therefore, the four types of outer side tubes 321 may be selected to define the bottom of the middle portion 32, and the overall arrangement of the plurality of outer side tubes 321 thus arranged is reasonable, have high structural strength, and can effectively separate the cockpit 10 and the power compartment 20. Two connected outer side tubes 321 may be fixed by welding.

As shown in FIGS. 4 and 5, the second outer side tube 328 includes a first bottom tube section 328a and a front tube section 328b. The first bottom tube section 328a is connected between the first outer side tube 327 and the third outer side tube 329, and the middle portion 32 further includes: a front support frame 326, the front support frame 326 is connected to the first outer side tube 327, the front tube section 328b is arranged obliquely upward, and the front tube section 328b is connected between the upper part of the front support frame 326 and the front end of the first bottom tube section 328a. The arrangement of the front tube section 328b may effectively strengthen the structural strength of the middle portion 32, and since the front tube section 328b is arranged obliquely, it may effectively protect the driver and the passenger in the cockpit 10 and improve the riding safety of the driver and the passenger.

As shown in FIGS. 4 and 5, the second outer side tube 328 further includes: a rear tube section 328c, the fourth outer side tube 330 further includes: a second bottom tube section 330a, a left tube section 330b and a right tube section 330c. The second bottom tube section 330a is connected between the left tube section 330b and the right tube section 330c. The rear ends of the two inner longitudinal beams 322 are connected to the second bottom tube section 330a, the left tube section 330b and the right tube section 330c are both arranged obliquely, and the upper ends of the left tube section 330b and the right tube section 330c are connected to the upper part of the rear tube section 328c on the corresponding side. Therefore, the rear tube section 328c is arranged obliquely backward, the arrangement of the rear tube section 328c may effectively strengthen the structural strength of the middle portion 32, and it may effectively protect the driver and the passenger in the cockpit 10 and improve the riding safety of the driver and passenger. In addition, due to the arrangement of the left tube section 330b and the right tube section 330c, the fourth outer side tube 330 may effectively separate the cockpit 10 and the power compartment 20, and may effectively protect the driver and the passenger in the cockpit 10 and improve the riding safety of the driver and passenger.

Further, as shown in FIGS. 4 and 5, an upper cross beam 341 is connected between the upper part of the left tube section 330b and the upper part of the right tube section 330c. The upper cross beam 341 thus arranged may effectively strengthen a rear structural strength of the middle portion 32, and the upper cross beam 341 may separate the cockpit 10 and the power compartment 20, which may ensure the safety of the driver and the passenger. The upper cross beam 341 may also serve to install the seat bracket 40. For example, the left and right ends of the upper cross beam 341 may be provided with mounting brackets respectively, and the rear end of the seat bracket 40 may be detachably installed on the corresponding mounting bracket.

At least one of the first outer side tube 327, the second outer side tube 328, the third outer side tube 329, and the fourth outer side tube 330 is an integrally formed tube, and the tube may be a round tube or a square tube. The outer side tube 321 thus arranged has a simple structure and a light weight, and can ensure the structural stability of the vehicle frame 30. Preferably, the above four outer side tubes 321 are all round tubes.

Specifically, as shown in FIGS. 1 and 2, the vehicle body 100 may further include: a ceiling 60, and the ceiling 60 may be detachably installed at the middle portion 32. The ceiling 60 forms another part of the cockpit 10, or in other words, the ceiling 60 forms a top structure of the cockpit 10. The combination of the ceiling 60 and the middle portion 32 may form a basic frame of the cockpit 10, thereby better ensuring the safety of the driver and the passenger in the cockpit 10. Moreover, the detachable installation method may reduce the difficulty of installation and disassembly of the ceiling 60. As shown in FIGS. 1 and 2, the ceiling 60 may be detachably installed on the upper part of the front support frame 326, the upper part of the left tube section 330b and the upper part of the right tube section 330c. The upper part of the front support frame 326 has two support tubes spaced apart from the left and right for connecting the ceiling 60. For example, the lower parts of four pillars of the ceiling 60 may be provided with mounting holes, and the upper part of the front support frame 326, the upper part of the left tube section 330b and the upper part of the right tube section 330c may also be provided with mounting holes, and the middle portion 32 may be fixedly connected by fasteners.

According to an alternative embodiment of the present disclosure, the power battery 300 is provided in plural and a plurality of the power batteries are arranged transversely in interval. The transverse direction is the left-right direction shown in FIGS. 1 and 2, in other words, a plurality of power batteries 300 are substantially distributed in the cockpit 10, and the plurality of power batteries 300 are distributed transversely in interval, so that the lower space of the seat bracket 40 may be reasonably utilized, sufficient electric energy may be provided for the power motor 210, moreover, the load distribution uniformity in the cockpit 10 may be facilitated.

Specifically, there are two power batteries 300, the all-terrain vehicle may further include a transmission shaft extending longitudinally and drivingly connected to the powertrain 200, and the transmission shaft is located between the two power batteries 300. The transmission shaft transmits with the power motor 210, where the power motor 210 may be connected with a gearbox, and an output end of the gearbox is connected to an input end of the transmission shaft. The two power batteries 300 may be arranged symmetrically about the transmission shaft. The two power batteries 300 thus arranged have good stability and can provide sufficient electric energy for the power motor 210.

As shown in FIGS. 3 to 5, there are two inner longitudinal beams 322, the two inner longitudinal beams 322 are arranged transversely opposite to each other, and the two inner longitudinal beams 322 define the installation space of the transmission shaft of the all-terrain vehicle 1000. In other words, space between the two inner longitudinal beams 322 is the installation space of the transmission shaft, so that the two inner longitudinal beams 322 can not only improve the structural strength of the bottom of the vehicle frame 30, but also separate the transmission shaft from other components, thereby ensuring the installation reliability of the transmission shaft.

Alternatively, as shown in FIGS. 4 and 5, a support bar 324 is connected between the two inner longitudinal beams 322. The support bar 324 is used to support the transmission shaft, and the transmission shaft may be provided with a bearing and a bearing seat. The support bar 324 is used to support and fix the bearing seat, and its left and right ends may be provided with mounting holes for fixing the bearing seat.

A groove is provided at the bottom of the middle portion 32, and the power battery 300 is provided in the groove. The arrangement of the groove may facilitate the installation and fixation of the power battery 300, which may accommodate the bottom of the power battery 300, and may also provide some installation points for the power battery 300, so as to better ensure the installation reliability of the power battery 300.

Specifically, as shown in FIGS. 4 and 5, the middle portion 32 may further include: an inner cross beam 325, which is connected between the inner longitudinal beam 322 and the outer side tube 321, a part of the outer side tube 321, the inner cross beam 325, and a part of the inner longitudinal beam 322 form a groove on the bottom plate 323, and the groove is a part of the installation space. A part of the outer side tube 321 includes: a part of the first bottom tube section 328a of the second outer side tube 328, and a part of the second bottom tube section 330a of the third outer side tube 329 and the fourth outer side tube 330. It may be understood that a part of the bottom plate 323 on the front side of the inner cross beam 325 is configured as a pedal area, and the other part of the bottom plate 323 on the rear side of the inner cross beam 325 is configured as a component placement area. The arrangement of the inner cross beam 325 may effectively limit the degree of freedom of the components, and may ensure the reliability of the placement of the components under the seat bracket 40.

Further, the all-terrain vehicle 1000 may further include: a storage box, and the storage box is provided inside the seat bracket 40 and located above the power battery 300. In other words, the storage box is provided below the seat 50 and above the power battery 300. The storage box thus provided may make reasonable use of the space at the seat bracket 40 and may improve the space utilization of the cockpit 10, and the storage box thus provided may facilitate the driver and the passenger to pick and place items.

Alternatively, as shown in FIG. 2, the all-terrain vehicle 1000 may further include: a controller 500, the controller 500 is provided in the power compartment 20, that is, the controller 500 is provided in the rear portion 33 of the vehicle frame 30, and the controller 500 is electrically connected to the power battery 300 and the power motor 210, respectively. The controller 500 may acquire the working status of the power battery 300 and the power motor 210, and then use the acquired information to reasonably control the power battery 300 to work. Moreover, by providing the controller 500 in the power compartment 20, on the one hand, the space of the power compartment 20 may be reasonably used, and on the other hand, the controller 500 may be conveniently connected to the power battery 300 and the power motor 210 at the same time. The controller 500 may be located on the upper right side of the power motor 210 and at the same time on the upper rear side of the power battery 300.

Specifically, as shown in FIGS. 4 and 5, the rear portion 33 further includes two upper side beams 334, and an upper cross beam 341 is connected between the front ends of the two upper side beams 334, the upper cross beam 341 and the upper side beam 334 on the right side are provided with a controller bracket 340 for installing the controller 500. In other words, the controller 500 is installed not only on the upper side beam 334 on the right side, but also on the upper cross beam 341 on the front side. The controller 500 thus arranged has good installation reliability. The controller bracket 340 may be multiple, for example, three. One of the three controller brackets 340 is arranged on the upper side beam 334 on the right side, and the other two controller brackets 340 are arranged on the right half of the upper cross beam 341. The controller 500 using three-point fixation has better stability and is closer to the power battery 300.

As shown in FIGS. 4 and 5, the rear portion 33 includes two lower side beams 331. The two lower side beams 331 are located below the two upper side beams 334. The two lower side beams 331 are both connected to the rear of the middle portion 32. The distance between the two lower side beams 331 shows a decreasing trend from front to back. The two lower side beams 331 thus arranged may gradually reduce the space of the power compartment 20, may make the power compartment 20 better install and fix the powertrain 200, and can make its structure simpler. As shown in FIGS. 4 and 5, the distance between the two upper side beams 334 shows a decreasing trend from front to back. The two upper side beams 334 thus arranged may effectively support and fix a cargo hopper 70, and may better define the power compartment 20 with the two lower side beams 331, which may make the space of the power compartment 20 suitable, and the powertrain 200 can be placed reasonably.

Specifically, as shown in FIGS. 4 and 5, a middle cross beam 332 is also connected between the two lower side beams 331, and the middle cross beam 332 is provided with a bottom mounting member 333 for installing the powertrain 200. The middle cross beam 332 may support and fix the powertrain 200. The bottom mounting member 333 may be used to fix the powertrain 200. For example, the bottom mounting member 333 may be used to fix the power motor 210.

As shown in FIG. 2, the all-terrain vehicle 1000 may further include: a radiator 600, the radiator 600 is fixed to the front portion 31, and the radiator 600 is respectively connected to the power motor 210 and the controller 500 through pipelines. Fixing the radiator 600 to the front portion 31 of the vehicle frame 30 on the one hand may facilitate heat dissipation of the radiator 600 and improve a heat dissipation efficiency of the powertrain 200, on the other hand, it may reasonably use the space of the front portion 31.

Specifically, an outlet of the radiator 600 is connected to the controller 500 through a first pipeline, the controller 500 is connected to the power motor 210 through a second pipeline, and the power motor 210 is connected to an inlet of the radiator 600 through a third pipeline. In other words, the radiator 600, the controller 500, and the power motor 210 are connected in series through pipelines. Coolant at the radiator 600 may first enter the controller 500 for cooling, then enter the power motor 210 for cooling, and finally return to the radiator 600 to complete a loop cycle. The radiator 600 thus arranged may meet the heat dissipation requirements of the controller 500 and the power motor 210 at the same time, and the pipeline arrangement is simple.

Further, as shown in FIGS. 4 and 5, a connecting beam 337 is provided between the upper side beam 334 and the lower side beam 331 on the same side. The connecting beam 337 may effectively connect the upper side beam 334 and the lower side beam 331 on the same side, which may improve the structural reliability of the rear portion 33, and the connecting beam 337 may also provide corresponding installation and fixing positions to facilitate the installation and fixation of other components (such as an upper rocker arm and a lower rocker arm of a rear suspension system).

As shown in FIG. 5, the distance between the connecting beam 337 on the left and the corresponding connecting beam 337 on the right shows a decreasing trend from top to bottom. The connecting beams 337 thus arranged may change a position of an installation axis of the upper rocker arm and the lower rocker arm, thereby improving the structural stability of the rear portion 33 and prolonging the service life of the vehicle frame 30.

As shown in FIG. 4, the front portion 31 includes: a rocker arm bracket 311 and a bottom sheet metal 312, and the rocker arm bracket 311 is connected to the front end of the bottom sheet metal 312 and the front end of the front support frame 326. The rocker arm bracket 311 is used to install the inner ends of the upper rocker arm and the lower rocker arm. The rocker arm bracket 311 may simultaneously install the inner ends of two upper rocker arms and the inner ends of two lower rocker arms, which may reduce the installation difficulty of the upper rocker arms and the lower rocker arms, and has a simple structure and light weight. The bottom sheet metal 312 may be used to support and fix a reducer of the front axle, which may ensure the installation reliability of the reducer.

According to another alternative embodiment of the present disclosure, as shown in FIGS. 1 and 2, the powertrain 200 further includes: an engine 220, and the power motor 210 is provided on one side of the engine 220. In other words, the all-terrain vehicle 1000 is a hybrid all-terrain vehicle 1000, the engine 220 and the power motor 210 are both provided in the power compartment 20, and the two are connected together, so that the compactness of the powertrain 200 may be improved. A crankshaft of the engine 220 and a motor shaft of the power motor 210 may be coaxially provided, so that the power of the two may be directly output, and the overall structure is stable.

As shown in FIG. 4 and FIG. 5, there may be two bottom mounting members 333, and the two bottom mounting members 333 are spaced apart from the left and right to fix both sides of a cylinder block of the engine 220. The cylinder block of the engine 220 is provided with transverse mounting holes on both sides, and the bottom mounting members 333 are cylinder block lifting lugs. The cylinder block lifting lugs are installed and fixed with the corresponding transverse mounting holes by fasteners, so that the engine 220 can be firmly fixed in the power compartment 20.

In addition, as shown in FIGS. 4 and 5, a detachable middle cross bar 335 is also provided between the two upper side beams 334, and the middle cross bar 335 is provided with a top mounting member 336 for installing the powertrain 200. The top mounting member 336 is used to fix a cylinder head of the engine 220, and the top mounting member 336 is a cylinder head lifting lug. In other words, on the basis of the installation and fixation at the bottom of the engine 220, the engine 220 also installs and fixes its cylinder head using the top mounting member 336, so that the engine 220 thus arranged may better ensure its stability in the power compartment 20. The top mounting member 336 may be provided with a shock absorbing block to reduce vibration transmitted from the engine 220 to the vehicle frame 30.

Further, as shown in FIG. 3, the powertrain 200 may further include: a fuel tank 700 for supplying fuel to the engine 220, the fuel tank 700 is provided between the seat bracket 40 and the middle portion 32, and the fuel tank 700 and the power battery 300 are arranged transversely in interval. Therefore, when considering the arrangement position of the power battery 300 for the all-terrain vehicle 1000, the arrangement position of the fuel tank 700 also needs to be considered. By arranging the fuel tank 700 and the power battery 300 transversely in interval, the lower space of the seat bracket 40 may be reasonably utilized. It should be noted that the fuel tank 700 is arranged on the side close to the engine 220, and the power battery 300 is arranged on the side close to the power motor 210. For example, the fuel tank 700 is arranged on the lower left side of the seat bracket 40, the power battery 300 is arranged on the lower right side of the seat bracket 40, and the power motor 210 is fixed on the right side of the engine 220. The components thus arranged may reduce connecting pipelines in between, and the overall layout is more reasonable. The fuel tank 700 is provided in a corresponding groove in the middle portion 32.

The transmission shaft is located between the fuel tank 700 and the power battery 300. In this way, the transmission shaft is provided in a transverse middle position of the vehicle frame 30, and the fuel tank 700 and the power battery 300 are distributed on both sides of the bottom plate 323. The fuel tank 700 and the power battery 300 thus arranged may reasonably allocate the interior space of the cockpit 10, Moreover, it may be beneficial to improve the load distribution uniformity of the all-terrain vehicle 1000 in the transverse direction.

Alternatively, the storage box is provided inside the seat bracket 40 and located above the power battery 300 and/or the fuel tank 700. In other words, the storage box may be located above the power battery 300 alone, or above the fuel tank 700 alone, or above the power battery 300 and the fuel tank 700 at the same time. The storage box thus arranged may further utilize the space at the seat bracket 40, and is convenient for the driver and the passenger to pick and place items.

As shown in FIG. 2, the controller 500 is provided in the power compartment 20, and the controller 500 is electrically connected to the power battery 300 and the power motor 210 respectively. The controller 500 may learn the working status of the power battery 300 and the power motor 210, and then use the known information to reasonably control the power battery 300 to work. Moreover, by providing the controller 500 in the power compartment 20, on the one hand, the space of the power compartment 20 may be reasonably used, and on the other hand, the controller 500 may be conveniently connected to the power battery 300 and the power motor 210 at the same time. The controller 500 may be located on the upper right side of the power motor 210 and at the same time on the upper rear side of the power battery 300.

Also, the all-terrain vehicle 1000 may further include: a first radiator 610 and a second radiator 620, the first radiator 610 is fixed to the front portion 31, the second radiator 620 is fixed on a front surface of the first radiator 610, the first radiator 610 is connected to the engine 220 through a pipeline, and the second radiator 620 is connected to the controller 500 and the power motor 210 through pipelines. It may be understood that because the operating temperatures of the engine 220 and the power motor 210 are different, the use of two radiators 600 to dissipate the heat respectively may ensure that the engine 220 and the power motor 210 are in their respective operating temperature ranges, thereby ensuring the working reliability of the powertrain 200 and prolonging the service life of the powertrain 200.

Specifically, an outlet of the second radiator 620 is connected to the controller 500 through a first pipeline, the controller 500 is connected to the power motor 210 through a second pipeline, and the power motor 210 is connected to an inlet of the radiator 600 through a third pipeline. In other words, the second radiator 620, the controller 500, and the power motor 210 are connected in series through pipelines. Coolant at the second radiator 620 may first enter the controller 500 for cooling, then enter the power motor 210 for cooling, and finally return to the second radiator 620 to complete a loop cycle. The second radiator 620 thus arranged may meet the heat dissipation requirements of the controller 500 and the power motor 210 at the same time, and the pipeline arrangement is simple.

As shown in FIG. 1, the all-terrain vehicle 1000 may further include: an air filter 800, the air filter 800 is provided at a rear of the cockpit 10, and the air filter 800 is in air connection with the engine 220. Specifically, the air filter 800 is fixed on the rear portion 33 of the vehicle frame 30, and the air filter 800 is located at the upper left of the engine 220, and an intake tube of the air filter 800 may extend vertically. The air filter 800 is provided adjacent to the engine 220, which may facilitate the intake of the engine 220, and may also make the overall layout of the all-terrain vehicle 1000 more compact and reasonable.

Also, as shown in FIG. 1, the all-terrain vehicle 1000 further includes: an exhaust apparatus 900, the exhaust apparatus 900 is provided behind the power compartment 20, and the exhaust apparatus 900 is in air connection with the engine 220. The exhaust apparatus 900 is also provided at the rear portion 33 of the vehicle frame 30, so that a gas path between the engine 220 and the exhaust apparatus 900 is short, so that an exhaust distance may be shortened and an exhaust effect may be improved.

As shown in FIG. 5, upper parts of two connecting beams 337 are respectively provided with upper mounting feet 338 for mounting upper suspensions of the exhaust apparatus 900. The upper mounting feet 338 may be provided with the upper suspensions, and the left and right ends of the upper part of the exhaust apparatus 900 may be fixed to the upper parts of the two connecting beams 337 through the upper suspensions, so that the installation reliability of the exhaust apparatus 900 may be improved.

As shown in FIG. 5, a rear axle mounting plate 339 is provided between lower parts of the two connecting beams 337 and the two lower side beams 331. The rear axle mounting plate 339 may be used to install a reducer of a rear axle. By providing the rear axle mounting plate 339 between the two lower side beams 331 and the two connecting beams 337, the installation reliability of the rear axle mounting plate 339 may be ensured.

Further, as shown in FIG. 5, the rear axle mounting plate 339 is formed with a lower mounting hole 339a for mounting a lower suspension of the exhaust apparatus 900. In other words, the lower mounting hole 339a may be provided with a lower suspension, and a lower midpoint of the exhaust apparatus 900 may be provided with the lower suspension. The lower suspension may support and fix the exhaust apparatus 900. Through the combination of two upper suspensions and one lower suspension, the installation reliability of the exhaust apparatus 900 may be improved.

The seat bracket 40 and the seat 50 will be described in detail below.

As shown in FIG. 3, the all-terrain vehicle 1000 further includes: the seat 50, and the seat 50 is detachably installed on the seat bracket 40. The seat 50 thus arranged is convenient for installation and disassembly, so that the seat 50 may be easily replaced and repaired. The seat 50 includes a seat cushion 51 and a backrest 52, the seat cushion 51 is detachably installed on the seat bracket 40, and the backrest 52 is detachably installed on the seat cushion 51. Therefore, the seat cushion 51 and the backrest 52 using the split result may be manufactured separately from the seat cushion 51 and the backrest 52, and an angle of the backrest 52 may be easily adjusted. For example, the rear of the seat cushion 51 may be provided with a plurality of sets of mounting holes in different positions. By selecting different sets of mounting holes, the installation position of the backrest 52 may be changed to meet the riding needs of the driver and the passenger.

Moreover, the seat 50 includes: a driver seat 50a and a passenger seat, the driver seat 50a and the passenger seat are distributed and are two independent seats 50, and both the driver seat 50a and the passenger seat are detachably installed on the seat bracket 40. The driver seat 50a and the passenger seat are manufactured separately, which may distinguish the driver and the passenger, and can avoid mutual influence.

In the description of the present disclosure, it should be understood that the terms "center", "longitudinal", "transverse", "length", "width", "thickness", "upper", "lower", "front", "back", "left", "right", "vertical", "horizontal", "top", "bottom", "inner", "outer", "clockwise", "counter clockwise", "axial", "radial", "circumferential", etc. indicate the orientation or positional relationship based on the orientation or positional relationship shown in the accompanying drawings, and are only for the convenience of describing the present disclosure and simplifying the description, and do not indicate or imply that the referred apparatus or element must have a specific orientation, be configured and operated in a specific orientation, and therefore cannot be understood as a limitation to the present disclosure.

In the description of the present disclosure, "first feature", "second feature" may include one or more of the features. In the description of the present disclosure, "plurality" means two or more. In the description of the present disclosure, the first feature being "above" or "below" the second feature may include the first and second features in direct contact, or it may include the first and second features not in direct contact but contact through another feature between them. In the description of the present disclosure, the first feature is "on", "above" and "on top of" the second feature include the first feature directly above and obliquely above the second feature, or it simply indicates that the first feature has a higher level than the second feature.

In the description of this specification, the description with reference to the terms "one embodiment", "some embodiments", "exemplary embodiments", "examples", "specific examples", or "some examples" etc. means that the specific feature, structure, material or feature described in combination with the embodiment or example is included in at least one embodiment or example of the present disclosure. In this specification, the schematic representations of the above terms do not necessarily refer to the same embodiment or example.

Although the embodiments of the present disclosure have been shown and described, those of ordinary skill in the art may understand that various changes, modifications, substitutions and variants may be made to these embodiments without departing from the principle and purpose of the present disclosure. The scope of the present disclosure is defined by the claims and their equivalents.

What is claimed is:

1. A side-by-side all-terrain vehicle, comprising:
a vehicle body, the vehicle body comprising a cockpit in which a driver performs driving operations and a power compartment for placing and fixing a powertrain, the power compartment being located behind the cockpit;
the powertrain, the powertrain comprising a power motor, the power motor being provided in the power compartment; and
a power battery, the power battery being provided in the cockpit, and the power battery being configured to supply power to the power motor;
wherein the side-by-side all-terrain vehicle further comprises: a controller, the controller is provided in the power compartment, and the controller is electrically connected to the power battery and the power motor respectively; and
wherein the vehicle body comprises a seat bracket provided in the cockpit, and the side-by-side all-terrain vehicle further comprises: a storage box, and the storage box is provided inside the seat bracket and located above the power battery.

2. The side-by-side all-terrain vehicle according to claim 1, wherein the vehicle body comprises: a vehicle frame, the vehicle frame comprises a front portion, a middle portion and a rear portion, the middle portion forms a part of the cockpit, the seat bracket is provided in the middle portion, the rear portion forms at least a part of the power compartment, and the power battery is provided between the seat bracket and the middle portion.

3. The side-by-side all-terrain vehicle according to claim 2, wherein the power battery is provided in plural, and a plurality of the power batteries are arranged transversely in interval.

4. The side-by-side all-terrain vehicle according to claim 3, wherein there are two power batteries, the side-by-side all-terrain vehicle further comprises a transmission shaft extending longitudinally and drivingly connected to the powertrain, and the transmission shaft is located between the two power batteries.

5. The side-by-side all-terrain vehicle according to claim 1, wherein the side-by-side all-terrain vehicle further comprises: a radiator, the radiator is fixed to the front portion, and the radiator is respectively connected to the power motor and the controller through pipelines.

6. The side-by-side all-terrain vehicle according to claim 5, wherein an outlet of the radiator is connected to the controller through a first pipeline, the controller is connected to the power motor through a second pipeline, and the power motor is connected to an inlet of the radiator through a third pipeline.

7. The side-by-side all-terrain vehicle according to claim 2, wherein the powertrain further comprises: an engine, and the power motor is provided on one side of the engine.

8. The side-by-side all-terrain vehicle according to claim 7, wherein the powertrain further comprises: a fuel tank for supplying fuel to the engine, the fuel tank is provided between the seat bracket and the middle portion, and the fuel tank and the power battery are arranged transversely in interval.

9. The side-by-side all-terrain vehicle according to claim 8, wherein the side-by-side all-terrain vehicle further comprises: a transmission shaft extending longitudinally and drivingly connected to the powertrain, and the transmission shaft is located between the fuel tank and the power battery.

10. The side-by-side all-terrain vehicle according to claim 9, wherein the side-by-side all-terrain vehicle further comprises: a storage box, and the storage box is provided inside the seat bracket and located above the power battery and/or the fuel tank.

11. The side-by-side all-terrain vehicle according to claim 7, wherein the side-by-side all-terrain vehicle further comprises: a first radiator and a second radiator, the first radiator is fixed to the front portion, the second radiator is fixed on a front surface of the first radiator, the first radiator is connected to the engine through a pipeline, and the second radiator is connected to the controller and the power motor through pipelines.

12. The side-by-side all-terrain vehicle according to claim 11, wherein an outlet of the second radiator is connected to the controller through a first pipeline, the controller is connected to the power motor through a second pipeline, and the power motor is connected to an inlet of the radiator through a third pipeline.

13. The side-by-side all-terrain vehicle according to claim 7, wherein the side-by-side all-terrain vehicle further comprises: an air filter, the air filter is provided at a rear of the cockpit, and the air filter is in air connection with the engine.

14. The side-by-side all-terrain vehicle according to claim 2, wherein a groove is provided at a bottom of the middle portion, and the power battery is provided in the groove.

15. The side-by-side all-terrain vehicle according to claim 2, wherein the seat bracket is detachably installed on the middle portion.

16. The side-by-side all-terrain vehicle according to claim 2, wherein a seat is provided on the seat bracket, the seat comprises a seat cushion and a backrest, the seat cushion is detachably installed on the seat bracket, and the backrest is detachably installed on the seat cushion.

17. The side-by-side all-terrain vehicle according to claim 16, wherein the seat comprises: a driver seat and a passenger seat, the driver seat and the passenger seat are distributed transversely and are two separate seats, and both the driver seat and the passenger seat are detachably installed on the seat bracket.

18. The side-by-side all-terrain vehicle according to claim 1, wherein the controller is configured to acquire the working status of the power battery and the power motor, and use the acquired information to control the power battery to work.

19. The side-by-side all-terrain vehicle according to claim 2, wherein the rear portion includes two upper side beams and an upper cross beam connected between front ends of the two upper side beams, and the upper cross beam and one of the two upper side beams which is adjacent to the power motor are respectively provided with at least one controller bracket for installing the controller.

* * * * *